United States Patent
Kinkade et al.

(10) Patent No.: US 12,198,244 B1
(45) Date of Patent: Jan. 14, 2025

(54) SYSTEMS AND METHODS FOR TRUE THREE-DIMENSIONAL STREAMING

(71) Applicant: Illuscio, Inc., Culver City, CA (US)

(72) Inventors: Kyle Kinkade, Mountlake Terrace, WA (US); Dwayne Elahie, Culver City, CA (US); Nolan Taeksang Yoo, Seattle, WA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/461,238

(22) Filed: Sep. 5, 2023

(51) Int. Cl.
| | |
|---|---|
| *H04N 21/81* | (2011.01) |
| *G06T 15/00* | (2011.01) |
| *H04N 13/117* | (2018.01) |
| *G06T 19/00* | (2011.01) |

(52) U.S. Cl.
CPC ........... *G06T 15/00* (2013.01); *H04N 13/117* (2018.05); *H04N 21/816* (2013.01); *G06T 19/003* (2013.01)

(58) Field of Classification Search
CPC .... H04N 13/275; H04N 13/279; H04N 7/157; H04N 21/816
See application file for complete search history.

(56) References Cited

U.S. PATENT DOCUMENTS

| | | | | |
|---|---|---|---|---|
| 2021/0264643 | A1* | 8/2021 | Joo | G06T 11/40 |
| 2021/0316212 | A1* | 10/2021 | Borovikov | A63F 13/355 |
| 2023/0326113 | A1* | 10/2023 | Hellge | G06T 13/20 |
| | | | | 345/473 |

OTHER PUBLICATIONS

Kumar, Sanjeev, et al. "Second life and the new generation of virtual worlds." Computer 41.9 (2008): 46-53. (Year: 2008).*

* cited by examiner

*Primary Examiner* — Ryan McCulley
(74) *Attorney, Agent, or Firm* — Ansari Katiraei LLP; Arman Katiraei; Sadiq Ansari

(57) ABSTRACT

Disclosed is a system that streams true three-dimensional ("3D") image data over a data network in a manner that preserves the dimensionality and detail of a dynamic and changing 3D scene. The system generates the 3D image data to represent the 3D scene, and streams different set of the 3D image data that are within different viewing frustums requested by different devices. The system generates updates to the 3D image data based on changes occurring at different parts of the 3D scene. The system streams a first update to the first device in response to image data updated by the first update being within the first device's viewing frustum, and streams a second update to the second device in response to image data updated by the second update being within the second device's viewing frustum.

20 Claims, 9 Drawing Sheets

SYSTEMS AND METHODS FOR TRUE THREE-DIMENSIONAL STREAMING

BACKGROUND

Streaming involves the sending of image data and/or other data for a game, video, communication session, animation, or other application over a data network. The amount of streamed data increases as the resolution of the images increases. Encoding and compression techniques are used to reduce the bandwidth requirements.

The amount of streamed data increases even more when streaming three-dimensional ("3D") image data instead of two-dimensional ("2D") image data. For instance, a 3D scene is formed with one or more 3D mesh or polygonal models. The 3D mesh or polygonal models are defined in a 3D coordinate space, are defined with constructs that provide a 360-degree or 3D form of the represented object, and are defined with colors, textures, and/or other visual information for each construct whether the surface represented by the construct is visible or not. To avoid streaming the 3D mesh or polygonal models, the 3D scene may be encoded and streamed as a 2D image. For instance, a server may render the 3D scene from a particular viewpoint, and may stream the 2D image representing the 3D scene from the particular viewpoint to user devices. Consequently, dynamic or changing 3D environments and scenes are not streamed using true 3D image data, but rather as encoded 2D image data or 2D images.

DETAILED DESCRIPTION OF PREFERRED EMBODIMENTS

The following detailed description refers to the accompanying drawings. The same reference numbers in different drawings may identify the same or similar elements.

Provided are systems and associated methods for true three-dimensional ("3D") streaming. The systems and methods allow for 3D image data to be streamed to one or more devices over a data network without buffering, lag, and/or excessive latency that negatively impact the user experience. From the streamed 3D image data, the one or more devices may directly reconstruct a dynamic and changing 3D scene. Accordingly, the true 3D streaming preserves the dimensionality and detail of the dynamic and changing 3D scene at the server and client sides in contrast to existing techniques that involve generating two-dimensional ("2D") images from rendering the 3D image data from a particular perspective at the server side prior to transmission of the 2D images to the client side.

The true 3D streaming supports the transfer of 3D image data over a data network for 3D games, 3D videos, 3D animations, 3D communication sessions (e.g., 3D video calls, 3D video conferences, etc.), 3D simulations, 3D interactive media, and/or other 3D applications (e.g., live event streaming) on the one or more receiving devices. For instance, the streamed 3D image data may be used to generate 3D holographic projections on the one or more devices, or may be used to generate accurate 3D models or representations in a 3D coordinate space on the one or more devices. More specifically, the true 3D streaming supports the real-time updating of the represented 3D scene based on inputs provided by the one or more devices and/or captured changes occurring in the represented 3D scene. The inputs may allow each device to view the 3D scene from different positions or viewpoints. The inputs may also allow each device to make changes to the 3D scene with the changes being incorporated into the subsequent 3D image data that is streamed in real-time to other devices viewing the same 3D scene.

The systems and methods are adapted to stream point cloud representations of a dynamic and changing 3D scene over a data network. A point cloud is defined with numerous points that are distributed in a 3D space. The points collectively form the represented 3D scene or one or more 3D objects. Points may be added to, removed from, or changed in the point cloud to animate the scene or represent changes occurring within a dynamic or changing scene over the stream duration.

Figure 1:
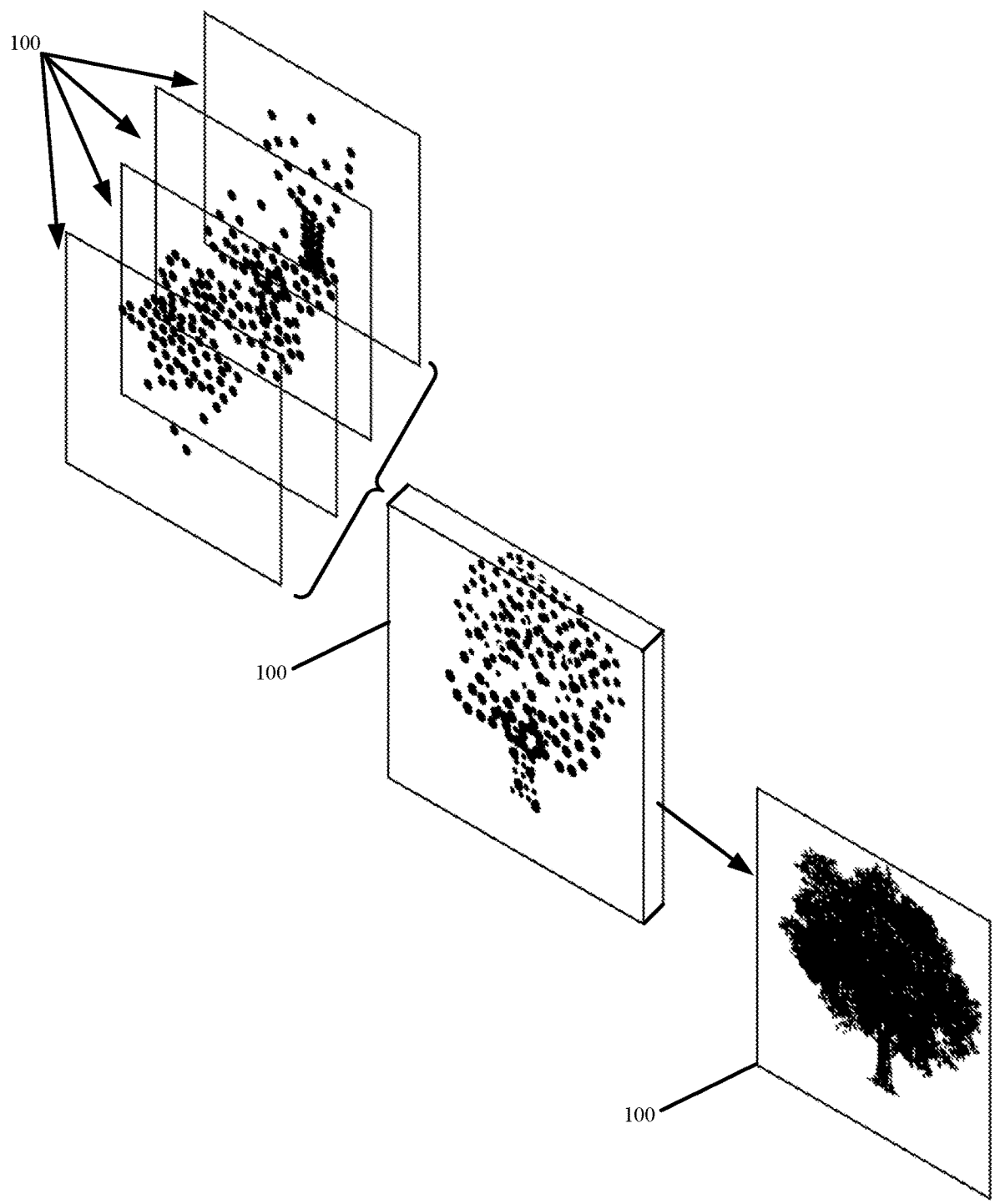
FIG. 1 illustrates an example point cloud in accordance with some embodiments presented herein.

FIG. 1 illustrates an example point cloud 100 in accordance with some embodiments presented herein. The points of point cloud 100 differ from pixels of a 2D image, because certain regions of point cloud 100 have no points, lower densities of points, and/or higher densities of points based on varying amounts of visual information that is detected, scanned, or created at those regions. Additionally, the position of the point cloud points are defined in a 3D space using x, y, and z coordinate values. In contrast, pixels of a 2D image are defined in a 2D space and have a uniform density or fixed arrangement that is defined by the resolution of the 2D image. In other words, the point cloud points may have a non-uniform placement or positioning, whereas the 2D image has pixel data for each pixel of a defined resolution (e.g., 640×480, 800×600, etc.).

Each point cloud point is defined with a plurality of elements. The plurality of elements includes a first set of positional elements and a second set of non-positional or descriptive elements. Values for the positional elements and/or non-positional elements of a particular point may be calculated from the return intensity of the light, laser, or signal reflecting off a corresponding surface and returning to the scanning device.

The positional elements include coordinates within a 3D space. For instance, each point cloud point includes x-coordinate, y-coordinate, and z-coordinate elements to capture the position of a corresponding physical point from a surface, feature, or object. The positional elements may further include a surface normal. The surface normal defines the angle, direction, or orientation that the surface, feature, or object represented by the point faces or is exposed to. More specifically, the surface normal is a line, ray, or vector that is perpendicular to the scanned surface, feature, or object represented by the point. In some embodiments, the positional elements may be defined for created points as opposed to being measured or scanned from physical objects.

The non-positional elements include information about the detected characteristics of the surface, feature, or object at a corresponding position in the scanned scene. The characteristics may correspond to a detected color (e.g., visual characteristics). The color may be represented using red, green, blue ("RGB"), and/or other color component values. In some embodiments, a point may have multiple sets of non-positional elements with each set of non-positional elements storing intensity values or other hyperspectral values detected across a different band of the electromagnetic spectrum. For instance, a first set of non-positional elements may store values measured in the 800 to 2,500 nanometer wavelengths for near-infrared light, and a second set of non-positional elements may store values measured in the 10 to 400 nanometer wavelengths for ultraviolet light from the position of the real-world object identified by the associated positional elements of the point.

In some embodiments, the non-positional elements store other measured or derived characteristics including the chrominance, hardness, translucence, reflectivity, luminance, metallic characteristics, roughness, specular, diffuse, albedo, index of refraction ("IOR"), and/or other properties from the imaged or created surface, feature, or object. In some embodiments, the non-positional elements directly identify a material property or other classification for a point. For instance, a first point may be defined with a non-positional element with a value that identifies the material property of "aluminum", a second point may be defined with a non-positional element with a value that identifies the material property of "steel", and a third point may be defined with a non-positional element with a value that identifies the material property of "plastic". These material properties may be associated with different values for the chrominance, hardness, translucence, reflectivity, luminance, and/or other visual characteristics of the point defined with a material property.

Each point cloud point includes an array of elements. The array of elements may provide the positioning of the point in a 3D space (e.g., the positional elements) as well as one or more characteristics (e.g., the non-positional elements) of that point. For instance, a point may be stored and/or represented as an array of elements with some combination of x-coordinate, y-coordinate, z-coordinate, RGB values, values measured in the near-infrared band, values measured in the far-infrared band, values measured in the ultraviolet band, values measured in other hyperspectral bands, chrominance, hardness, translucence, reflectivity, luminance, metallic characteristics, roughness, specular, diffuse, albedo, IOR, tesla, and/or other values.

Figure 2:
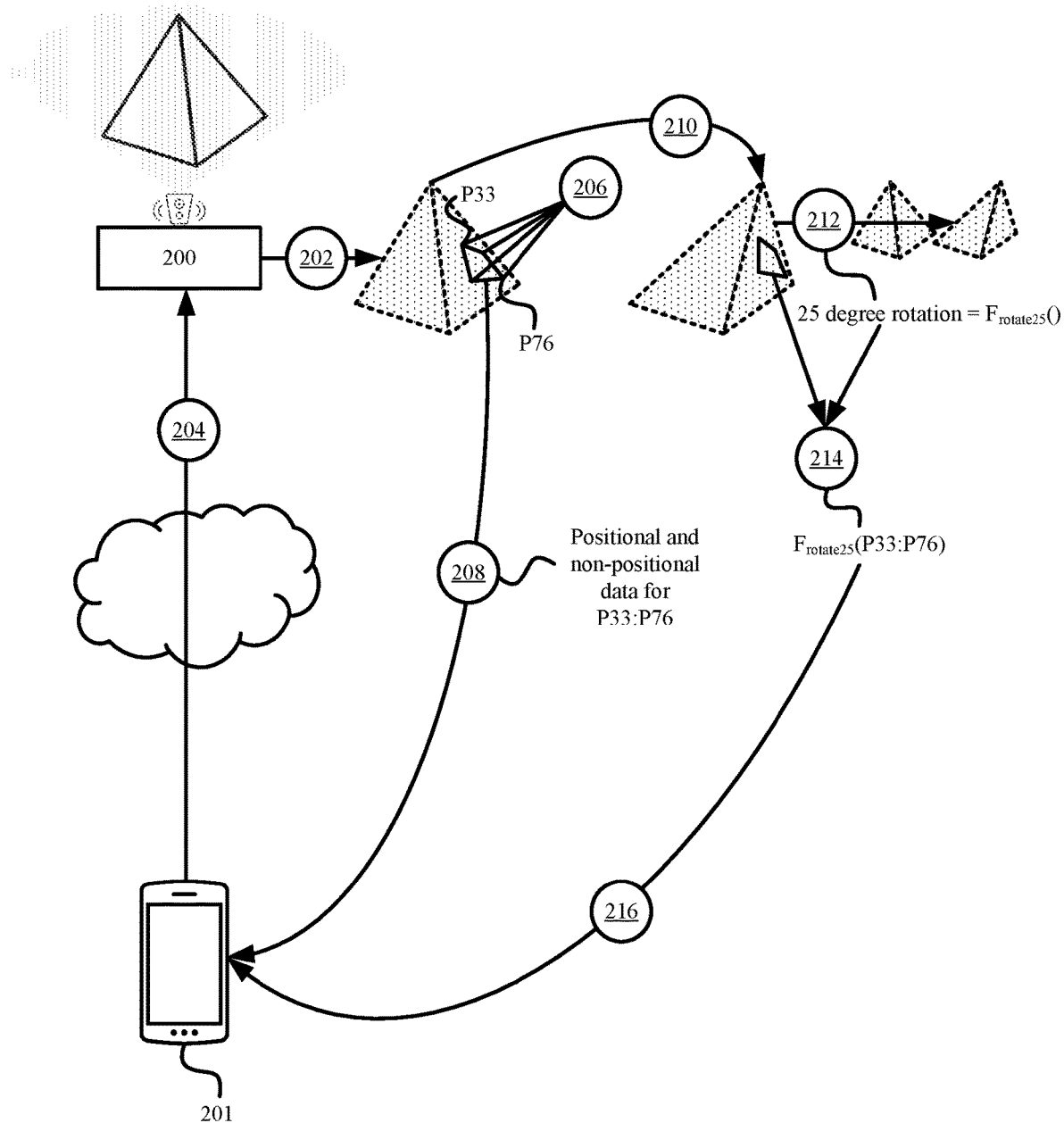
FIG. 2 illustrates an example for true three-dimensional ("3D") streaming of point cloud data for a dynamic and changing 3D scene in accordance with some embodiments presented herein.

FIG. 2 illustrates an example for true 3D streaming of point cloud data for a dynamic and changing 3D scene in accordance with some embodiments presented herein. 3D streaming system 200 generates (at 202) one or more point clouds for a 3D scene or one or more 3D objects of a requested 3D stream.

In some embodiments, 3D streaming system 200 generates (at 202) the point cloud based on output that 3D streaming system 200 receives from one or more scanners and/or imaging devices. For instance, 3D streaming system 200 receives scanning data of an actual scene from the one or more scanners or imaging devices, and generates a point in the point cloud for each scanned surface or feature of the actual scene. In some embodiments, the scanners or imaging devices may be integrated or coupled to user devices that connect to 3D streaming system 200 for a real-time 3D communication session. In some such embodiments, the scanners or imaging devices may perform a 3D scan or capture of the head and/or body of each participant in the communication session or of the entire room. 3D streaming system 200 may generate (at 202) the point cloud from the 3D scans or captures. In some other embodiments, 3D streaming system 200 may receive 2D images that capture a scene from different positions, and may use one or more photogrammetry or other 3D modeling techniques to generate (at 202) the point cloud from the 2D images. In still some other embodiments, 3D streaming system 200 may receive positional measurements of surfaces detected in a scene, may define points in the 3D space of the point cloud that correspond to the received positional measurements, may receive color information of the scene, and may map the color information from the surfaces detected in the scene to the points that were defined at the surface positions.

3D streaming system 200 receives (at 204) a request from user device 201 to join the stream. The request may specify a position from which to view or render the point cloud. For instance, the point cloud may represent a 360 degree representation of a 3D scene, and the request may specify a position for a specific field-of-view from the 3D scene. In some embodiments, the position may correspond to a position of a virtual camera in the 3D space of the point cloud, and a viewing frustum may be generated from the virtual camera position to define the specific field-of-view within the point cloud. In some other embodiments, 3D streaming system 200 may provide user device 201 with a default field-of-view or an initial viewing frustum.

3D streaming system 200 determines (at 206) a subset of points from the point cloud within the viewing frustum or the field-of-view associated with the request. In other words, rather than stream all points of the point cloud to user device 201, 3D streaming system 200 selects (at 206) the subset of points for the part of the 3D scene that is within the field-of-view requested by user device 201. 3D streaming system 200 may further reduce the number of points to stream by including points within the subset of points that are not entirely obscured by other points. Accordingly, 3D streaming system 200 determines (at 206) a subset of points that are wholly or partially visible within the viewing frustum or field-of-view.

3D streaming system 200 streams (at 208) the subset of points to user device 201 in response to the request. The subset of points provide all the 3D image data for rendering a true 3D visualization of the 3D scene represented by the point cloud.

3D streaming system 200 updates (at 210) the point cloud based on inputs from user device 201 and/or changes occurring within the 3D scene. For instance, the inputs from user device 201 may reposition, change colors, and/or otherwise adjust one or more points in the point cloud. The inputs may also change the field-of-view that is presented on user device 201. Updating (at 210) the point cloud for a changed field-of-view may include identifying new points that are introduced into the changed field-of-view and/or existing points from a last field-of-view that are no longer within the changed field-of-view and should therefore be removed.

In some embodiments, the point cloud may be part of a live stream, video, communication session, animation, simulation, or interactive media. In such cases, 3D streaming system 200 may receive a continual feed of 3D scan data or 2D images from different positions, and may update (at 210) the point cloud by generating new point clouds based on the incoming 3D scan data or 2D images.

3D streaming system 200 tracks (at 212) the points that change after each update (e.g., from one time to another or from a last point cloud to a next point cloud). Tracking (at 212) the points that change may include associating a timestamp to points of the last point cloud that are to be removed from the next point cloud as a result of the update and/or a timestamp to new points that do not exist in the last point cloud and that are added to the next point cloud as a result of the update. The timestamp may specify when existing points are to be removed from the dynamic or changing 3D scene, or may specify when the new points are to be added to the dynamic or changing 3D scene. Tracking (at 212) the points that change may also include defining transformations to model the change that is applied to the positions or visual characteristics of one or more points. A transformation may be defined as a mathematical equation, expression, or formula. The transformation may be specified with a time parameter and indices or links to one or more points whose positioning or visual characteristics are adjusted by the transformation. The mathematical equation may specify how the positioning or visual characteristics of the indexed or linked points are adjusted, and the time parameter may specify when the transformation is applied to the indexed or linked points and the duration of the time over which the transformation is applied to the indexed or linked points.

3D streaming system 200 selects (at 214) one or more updates that affect the current field-of-view presented to user device 201. In response to the viewing frustum or field-of-view of user device 201 not changing, 3D streaming system 200 determines if any of the subset of points in the viewing frustum or field-of-view were updated and/or linked to a defined transformation, and selects (at 214) the linked transformations as the updates to stream to user device 201. 3D streaming system 200 also determines if any new points are introduced into the viewing frustum or any existing points are removed from the viewing frustum. In response to determining that the viewing frustum or field-of-view has changed for user device 201, 3D streaming system 200 selects (at 214) a new subset of points that fall within the changed viewing frustum or changed field-of-view to stream to user device 201. In other words, user device 201 may not have received the data for the points in the changed field-of-view, and so 3D streaming system 200 will be unable to send only the transformations for those points to user device 201. In some embodiments, the field-of-view may change to include some of the previously streamed subset of points and some new points. In some such embodiments, selecting (at 214) the updates includes selecting any transformations that are linked to the points of the previously streamed subset of points remaining within the changed field-of-view and data for the new points within the changed field-of-view.

3D streaming system 200 streams (at 216) the selected updates to user device 201. Specifically, 3D streaming system 200 streams (at 216) the transformations affecting points already downloaded by user device 201, a subset of new points, and/or identifiers for downloaded points to remove. 3D streaming system 200 avoids streaming all points of the point cloud to user device 201 after each update and/or resending data for the same points that remain in the viewing frustum of user device 201 after updating (at 210) the point cloud. In this manner, 3D streaming system 200 minimizes the amount of 3D image data that is transmitted for a 3D video, animation, communication session, simulation, interactive media, or other changing visualization of the 3D scene. Moreover, 3D streaming system 200 streams true 3D image data to user device 201 unlike existing 3D streaming protocols that encode the 3D image data as 2D images and that stream the 2D images in place of the 3D image data.

The streaming data contains all the 3D image data that user devices 201 require to reconstruct different fields-of-view from the represented 3D scene. In other words, the streams provided by 3D streaming system 200 are adaptive and do not require 3D image data or 3D models of the objects in the 3D scene to be downloaded before the streaming session starts. As a result, user device 201 may join any stream at any time, and may receive and render the 3D assets in real-time. Also, 3D streaming system 200 may support communication sessions and/or other streams in which new 3D objects may be introduced into the 3D scene at any time without user device 201 having to download models or the 3D image data for the 3D objects prior to joining the communication sessions and/or other streams.

Even if user device 201 disconnects and reconnects to a stream, 3D streaming system 200 may provide the necessary data that synchronizes playback of the stream on the reconnected user device 201 with playback on other user devices 201. For instance, 3D streaming system 200 may stream updates for changes occurring in the point cloud to a connected set of user devices 201, and may detect a request from a new user device 201. 3D streaming system 200 determines that the new user device 201 does not have the prior point cloud data for the updates. Accordingly, instead of sending the updates to the new user device 201, 3D streaming system 200 transmits the data for the points that are in the current viewing frustum or field-of-view, and then sends the updates to all connected user devices 201 including the new user device 201.

To minimize the amount of data that is streamed to a reconnecting user device 201, 3D streaming system 200 may track the updates that are sent to each user device 201 and/or that are acknowledged as having been received by each user device 201. If a user device 201 is disconnected from the stream for a period of time and does not acknowledge receiving one or more updates and subsequently reconnects to the stream with a request message to 3D streaming system 200, 3D streaming system 200 may determine the one or more updates that the reconnecting user device 201 did not receive, and may transmit the one or more updates to the reconnecting user device 201 at one time rather than send all the data for all points in the current viewing frustum or field-of-view.

In some embodiments, the cumulative data associated with the missed one or more updates may exceed the data for all points in the current viewing frustum or field-of-view. In some such embodiments, 3D streaming system 200 may avoid sending the set of missed updates, and may send the point data instead.

In some embodiments, reconnecting user device 201 may have insufficient bandwidth or resources to receive all missed updates or all point data for the current viewing frustum or field-of-view. In some such embodiments, 3D streaming system 200 filters the missed updates to retain and transmit transformations or data for critical points in the current viewing frustum or field-of-view. For instance, an update may include moving the field-of-view and introducing a set of points that were outside the last field-of-view. Rather than send the data for each point of the set of points, 3D streaming system 200 identifies a subset of critical points within the set of points, and transmits the data for the subset of critical points. The subset of critical points may include a sampling of unique points within the set of points. User device 201 may receive and render the subset of critical points, and may generate points around the subset of critical points to emulate or recreate other non-critical points from the set of points that were not sent to user device 201. Similarly, 3D streaming system 200 may determine that reconnecting user device 201 may have insufficient bandwidth or resources to receive a missed update involving a complex transformation. Rather than send the complex transformation that may specify a series of precise adjustments to a set of points, 3D streaming system 200 may transmit a simplified transformation that approximates the series of precise adjustments to the set of points with a single adjustment.

In some embodiments, 3D streaming system 200 minimizes the amount of 3D image data that is transmitted over the duration of a streaming session by streaming all points of a point cloud to user device 201 upon user device 201 joining or connecting to a particular stream. In this case, if user device 201 changes the position of the viewing frustum or the field-of-view, 3D streaming system 200 may continue sending the transformations without having to send the data for the new points that were outside the initial viewing frustum or field-of-view and that come into the changed viewing frustum or field-of-view, and/or without sending the identifiers for the subset of points that are no longer within the changed viewing frustum or field-of-view. The new points that were outside the initial viewing frustum or field-of-view would have been already streamed to user device 201 upon user device 201 joining or connecting to the particular stream.

However, there may be too large of a delay associated with downloading an entire point cloud in response to a user device 201 request to join the corresponding stream. 3D streaming system 200 may also be unable to transmit parts of a 3D scene that are outside the current viewing frustum or field-of-view when those parts do not exist or are dynamically created in real-time as part of a changing live stream or communication session. There may also be some delay in 3D streaming system 200 sending the transformations to user device 201 and user device 201 applying the transformations to render the changes.

Accordingly, 3D streaming system 200 and user device 201 may implement various optimizations to the true 3D streaming to ensure a seamless and lag free experience over the duration of a 3D stream. The optimizations may include predictive 3D image data prefetching and client-side predictive rendering.

Figure 3:
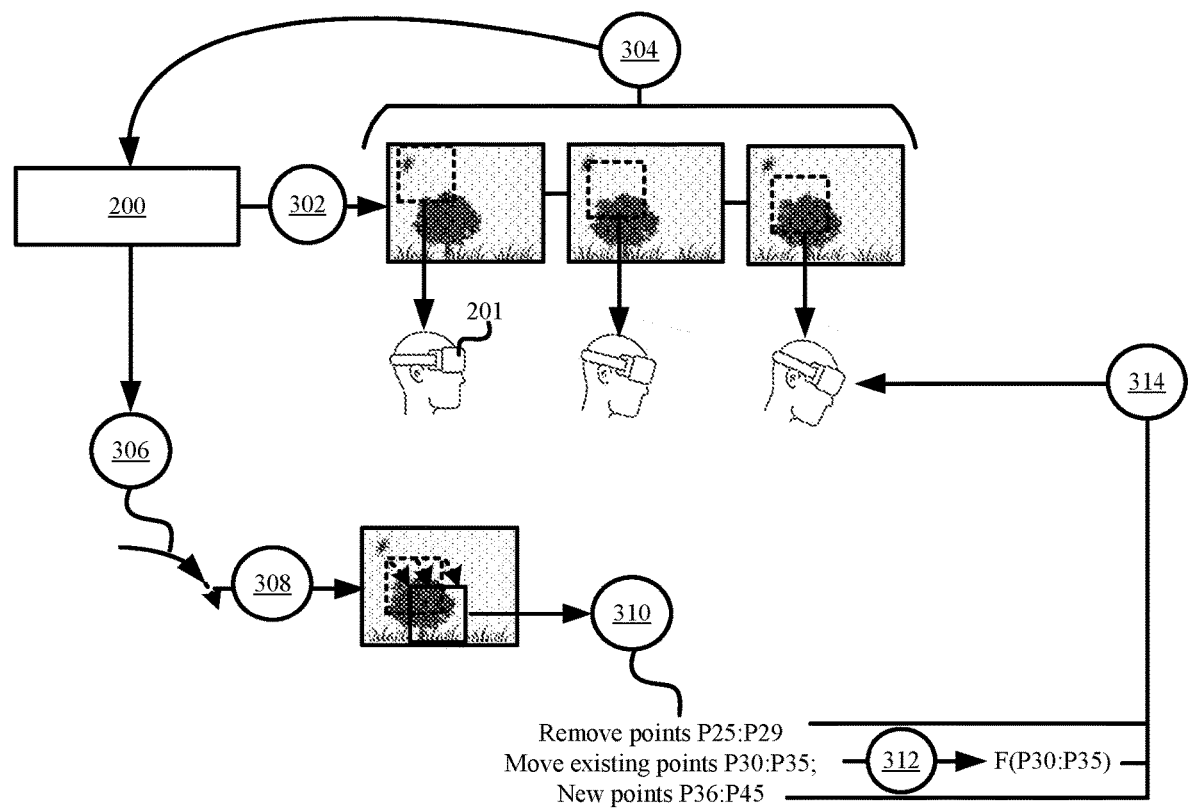
FIG. 3 illustrates an example of predictive 3D image data prefetching performed as part of the true 3D streaming in accordance with some embodiments presented herein.

FIG. 3 illustrates an example of the predictive 3D image data prefetching performed as part of the true 3D streaming in accordance with some embodiments presented herein. 3D streaming system 200 distributes (at 302) a 3D stream to user device 201 in response to user device 201 requesting to join the 3D stream. In this example, 3D streaming system 200 streams the set of points that are within an initial viewing frustum or field-of-view requested by user device 201, and updates the 3D stream by providing transformations that change the positioning and/or coloring of the previously streamed points or by providing new points that fall within a changing viewing frustum or field-of-view requested by user device 201.

3D streaming system 200 and/or user device 201 tracks (at 304) the manner with which the viewing frustum or field-of-view changes on user device 201. For instance, 3D streaming system 200 tracks (at 304) the direction and the amount with which the viewing frustum or field-of-view changes over an interval of time on user device 201 based on inputs provided by user device 201.

3D streaming system 200 generates (at 306) a predictive movement model based on the tracked (at 304) changes and/or the positional and/or non-positional elements of the point cloud points in the retained field-of-view. For instance, 3D streaming system 200 may determine that user device 201 retains the field-of-view on a particular object as it moves across the 3D scene, on foreground objects, on brightly colored objects, and/or to the right of a particular object.

3D streaming system 200 predicts (at 308) a next field-of-view that is likely to come after a current field-of-view based on the generated predictive movement model and/or tracked changes. Prior to user device 201 moving to or requesting the next field-of-view, 3D streaming system 200 selects (at 310) the subset of points that are within the next field-of-view, calculates (at 312) transformations to apply to points within the current field-of-view and the next field-of-view, and streams (at 314) the subset of points and/or transformations to user device 201.

User device 201 caches the prefetched subset of points and/or transformations. User device 201 monitors whether the user input changes the current field-of-view changes to the next field-of-view. If the user input changes the current field-of-view to a field-of-view that has no overlap with the predicted next field-of-view, user device 201 may remove the cached data and request the points and/or transformations for the new field-of-view. If the user input changes the current field-of-view to the next field-of-view, user device 201 retrieves and renders the next field-of-view using the prefetched and/or cached data.

Figure 4:
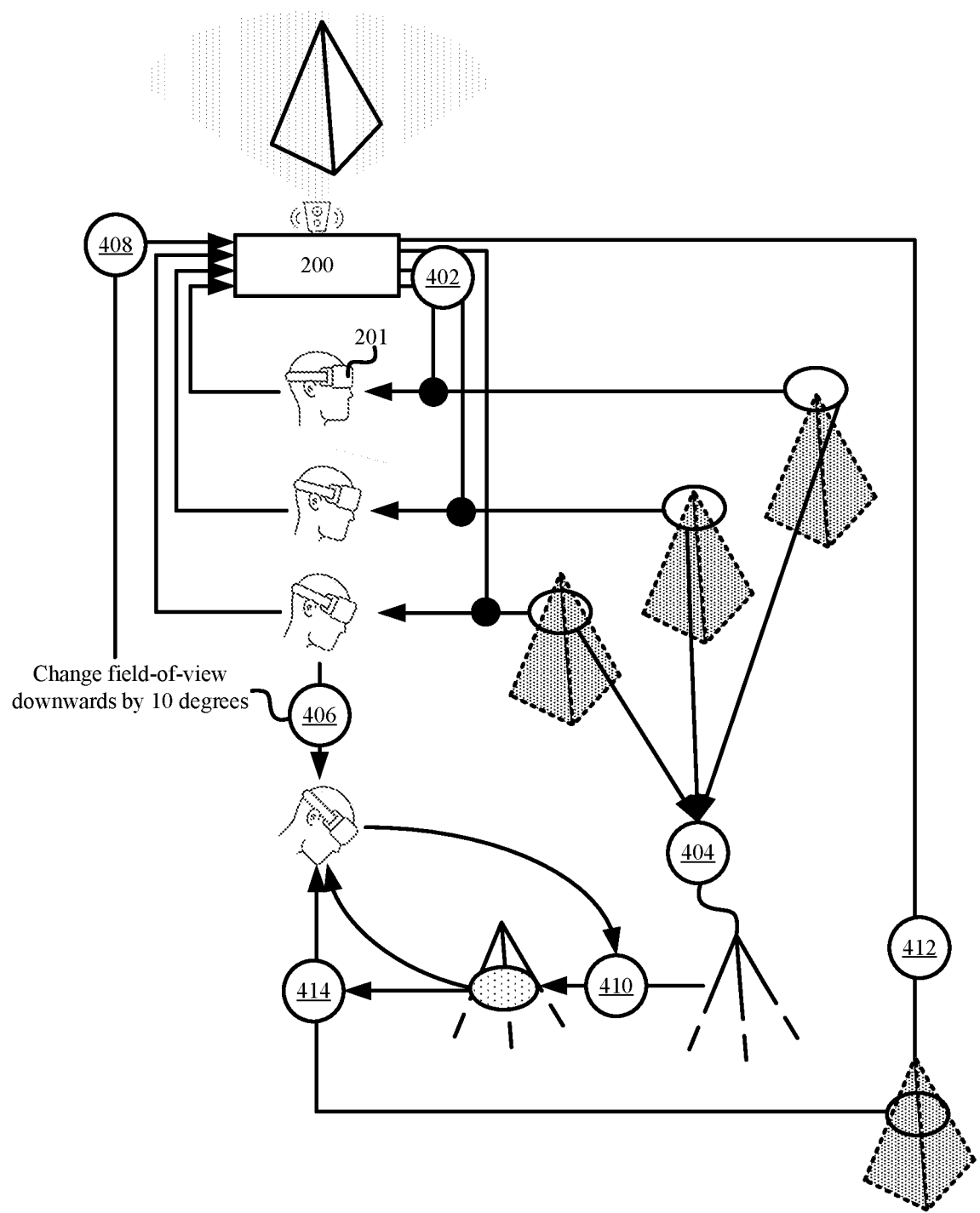
FIG. 4 illustrates an example of client-side predictive rendering in accordance with some embodiments presented herein.

FIG. 4 illustrates an example of the client-side predictive rendering in accordance with some embodiments presented herein. The client-side predictive rendering is performed when a change is made to the current field-of-view presented on user device 201, and user device 201 is waiting for the new point data or transformations of the changed field-of-view from 3D streaming system 200.

User device 201 may request and/or receive (at 402) data points and/or transformations for a changing field-of-view within a 3D scene. For instance, user device 201 may provide 3D streaming system 200 with coordinates or positions for the changing field-of-view. 3D streaming system 200 may calculate the differences between a last requested field-of-view and a current field-of-view, may determine new point data and/or transformations to apply to point data of the last requested field-of-view needed to produce the current field-of-view, and may stream the new point data and/or transformations to user device 201.

User device 201 may model (at 404) the how the 3D scene changes in each field-of-view. In some embodiments, user device 201 models (at 404) the shape, form, and/or coloring of one or more 3D objects in the 3D scene based on the changes that are applied to the one or more 3D objects in the direction of the changing field-of-view. In some such embodiments, user device 201 may use one or more artificial intelligence and/or machine learning ("AI/ML") techniques to perform the modeling and/or extrapolate the overall shape, form, and/or coloring of the one or more 3D objects based on the received data for the one or more 3D objects over the requested and received fields-of-view.

User device 201 may detect (at 406) input for an updated field-of-view that continues in the same direction as the previously requested and rendered changing fields-of-view. For instance, the changing field-of-view that was previously presented on user device 201 was in response to a downwards head movement, and the detected input for the updated field-of-view may be a continuation of that downwards movement.

User device 201 issues (at 408) a request for the updated field-of-view to 3D streaming system 200. The request may include coordinates of the updated render position and/or updated positions for the viewing frustum in the 3D space of the point cloud.

While awaiting a response from 3D streaming system 200, user device 201 predictively renders (at 410) the updated field-of-view based on the modeling (at 404) of the 3D scene and/or the modeling (at 404) of the received 3D image data for the one or more 3D objects presented in the previously requested and rendered fields-of-view. In some embodiments, user device 201 generates points and/or apply transformations to existing points in a last field-of-view in order to generate a simulated representation of the updated field-of-view. In some such embodiments, user device 201 may generate the points and/or apply the transformations based on the modeling of the fields-of-view that came before the updated field-of-view. For instance, user device 201 may have previously received point data and/or one or more transformations for moving the field-of-view down. The updated field-of-view may continue the downward movement. Accordingly, user device 201 may generate new points by following a determined pattern with which points were added in the previous fields-of-view, and may apply the same one or more transformations to the existing points in order to predictively render (at 410) the updated field-of-view. In other words, user device 201 may continue the movement or repositioning of one or more points from a last field-of-view in order to predictively render (at 410) the updated field-of-view, and provide an instantaneous but estimated presentation of the updated field-of-view on user device 201.

User device 201 receives (at 412) the true point data and/or transformations for the updated field-of-view from 3D streaming system 200 after predictively rendering (at 410) the updated field-of-view on user device 201. User device 201 corrects and/or enhances (at 414) the updated field-of-view that was predictively rendered (at 410) based on the received (at 412) point data and/or transformations for the updated field-of-view from 3D streaming system 200. In some embodiments, user device 201 compares the positioning and coloring of points in the predictively rendered (at 410) field-of-view to the positioning and coloring defined for the points in the received (at 412) point data and/or transformations, and adjusts the positioning and coloring of any points in the predictively rendered (at 410) field-of-view that deviate from the positioning and coloring defined in the received (at 412) point data and/or transformations. In some other embodiments, user device 201 renders the updated field-of-view by updating the previously rendered field-of-view based on the received (at 412) point data and/or transformations, and replaces the predictively rendered (at 410) field-of-view with the resulting rendering of the updated field-of-view.

The predictively rendered (at 410) field-of-view may be presented for a few milliseconds until user device 201 receives (at 412) and renders the true 3D image data for the updated field-of-view from 3D streaming system 200. Accordingly, replacing the predictively rendered (at 410) field-of-view with the actual representation of the updated field-of-view produces minimal or no noticeable change in the 3D scene, video, animation, or communication session being presented. In some embodiments, changing from the predictively rendered (at 410) field-of-view to the correctly rendered updated field-of-view mirrors other rendering techniques in which a low resolution or blurry image is made sharper and/or clearer at the client-side once the additional data is received from the server-side.

Figure 5:
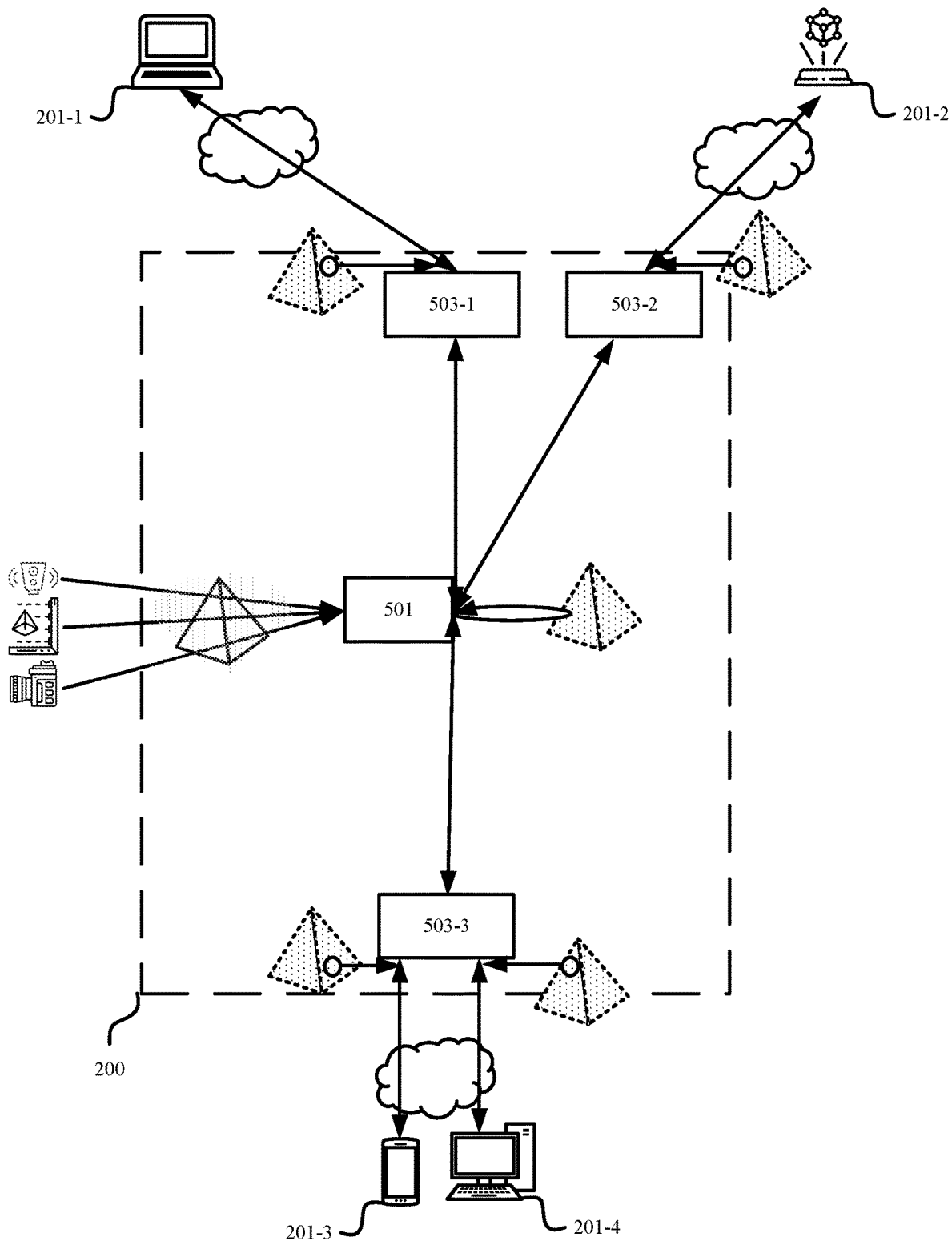
FIG. 5 illustrates an example distributed architecture for a 3D streaming system in accordance with some embodiments presented herein.

3D streaming system 200 may be implemented with a distributed architecture in order to reduce the latency associated with computing the transformations and changed point data for the different changing fields-of-view of different clients and streaming the transformations and changed point data to those clients. FIG. 5 illustrates an example distributed architecture for 3D streaming system 200 in accordance with some embodiments presented herein.

As shown in FIG. 5, 3D streaming system 200 include point cloud generator 501 and edge distribution devices 503-1, 503-2, and 503-3 (hereinafter collectively referred to as "edge distribution devices 503" or individually as "edge distribution device 503"). In some embodiments, 3D streaming system 200 may include more or fewer edge distribution devices 503.

Point cloud generator 501 receives scan data from one or more scanners and/or images from one or more imaging devices. The scanners may include 3D or depth-sensing cameras, Light Detection and Ranging ("LiDAR"), Magnetic Resonance Imaging ("MRI") devices, Positron Emission Tomography ("PET") scanning devices, Computerized Tomography ("CT") scanning devices, time-of-flight devices, and/or other equipment for perform 3D scans of a scene or environment and/or for measuring 3D positions and/or visual characteristics of the features or surfaces within the scene or environment. Imaging devices may include hyperspectral or visible light cameras that capture 2D images of the scene or environment from different positions.

In some embodiments, the scanners and/or imaging devices are equipment of a streaming provider, and are used to perform a 3D capture of a performance or event (e.g., concert, sporting event, news conference, etc.). In some other embodiments, the scanners and/or imaging devices are part of or are coupled to user devices 201. In some such embodiments, the scanners and/or imaging devices obtain 3D captures of the associated users that are then incorporated in a 3D communication session (e.g., 3D video call or conference).

Point cloud generator 501 represents one or more devices of 3D streaming system 200 with processor, memory, storage, network, and/or other hardware resources that are used to generate point clouds or 3D models based on the scan data and/or images acquired from the one or more scanners and/or imaging devices. In some embodiments, point cloud generator 501 maps the 3D positional measurements generated by the scanners into a 3D space of a point cloud, and generates points, polygons, meshes, or other 3D image constructs at the mapped positions. In some such embodiments, point cloud generator 501 attributes captured color values and/or other visual characteristics from 2D images of the same scene or additional scan data to the generated points. In some other embodiments, point cloud generator 501 performs a photogrammetry technique to define the point cloud and/or constructs for a 3D model of a scene from 2D images of the scene taken from different angles or positions.

In some embodiments, point cloud generator 501 generates a new point cloud whenever the represented 3D scene changes. The represented 3D scene may change when positioning or visual characteristics of one or more points in the represented 3D scene change. For instance, a user may edit part of the represented 3D scene by moving an object in the scene or by changing attributes of the object. The represented 3D scene may also change in response to a dynamic 3D scene. For instance, the represented 3D scene may be a 3D video feed of a live event that is continually changing.

Rather than stream the newly generated point cloud whenever the represented 3D scene changes, point cloud generator 501 compares the newly generated point cloud to a last generated point cloud of the represented 3D scene, and identifies points in the newly generated point cloud that differ from points in the last generated point cloud. Point cloud generator 501 defines one or more transformations that manipulate the positional and/or non-positional elements of a set of points in the last generated point cloud to match the positioning and/or visual characteristics of the identified points in the newly generated point cloud that differ from points in the last generated point cloud. Point cloud generator 501 links the one or more transformations to the set of points. Linking a transformation to a set of points may include associating a unique identifier or index of each point from the set of points to the transformation definition. For instance, point cloud generator 501 may identify a set of points that move along an arc over a particular duration. Point cloud generator 501 defines a mathematical formula and/or expression that recreates the movement (e.g., arc) with the same curvature over the same distance, and associates the x, y, and z positional coordinates of each point (e.g., unique point identifiers) from the set of points to the mathematical formula with a time parameter that specifies the duration over which to move the set of points over the curve and distance of the represented arc. Point cloud generator 501 streams the transformations that are defined for existing points of the last generated point cloud that have moved or been adjusted in the newly generated point cloud to edge distribution devices 503 instead of streaming all points of the newly generated point cloud.

In some embodiments, the newly generated point cloud may contain new points for new surfaces or features that were not present in the last generated point cloud. In some such embodiments, point cloud generator 501 identifies the set of new points that did not exist in the last generated point cloud, and streams the set of new points to edge distribution devices 503 instead of streaming all points of the newly generated point cloud. The set of new points may be associated with a timestamp to indicate when they are to be added or rendered as part of the 3D stream.

Point cloud generator 501 may also detect points from the last generated point cloud that are no longer part of the newly generated point cloud. Point cloud generator 501 may stream the identifiers or indices of the removed points with a timestamp to edge distribution devices 503, and edge distribution device 503 may remove the identified points from the newly generated point cloud at the specified time of the timestamp.

Edge distribution devices 503 are geographically proximate to different network edges from which different sets of user devices 201-1, 201-2, 201-3, and 201-4 (hereinafter collectively referred to as "user devices 201" or individually referred to as "user device 201") access the data network. For instance, edge distribution devices 503 may be collocated with networking equipment of Internet Service Providers ("ISPs") or Radio Access Networks ("RANs") of a wireless telecommunications provider. Alternatively, edge distribution devices 503 may be distributed to different geographic locations (e.g., different cities, states, zip codes, etc.) in order to improve the 3D streaming for user devices 201 in the same geographic location.

Each edge distribution device 503 receives the point cloud data from point cloud generator 501 as the data is updated. For instance, each edge distribution device 503 receives all points for an initial point cloud followed by the transformations and new points for updating the initial point cloud. Edge distribution devices 503 maintain a synchronized and updated copy of the entire point cloud at different network locations based on the updates provided by point cloud generator 501.

Edge distribution devices 503 manage the distribution of the updated point cloud data to different user devices 201. Specifically, edge distribution devices 503 track the viewing frustum or field-of-view with which different user devices 201 access the dynamic and changing 3D scene, and manage the distribution of the updated point cloud data that is within the different viewing frustums or fields-of-view of different user devices 201.

Figure 6:
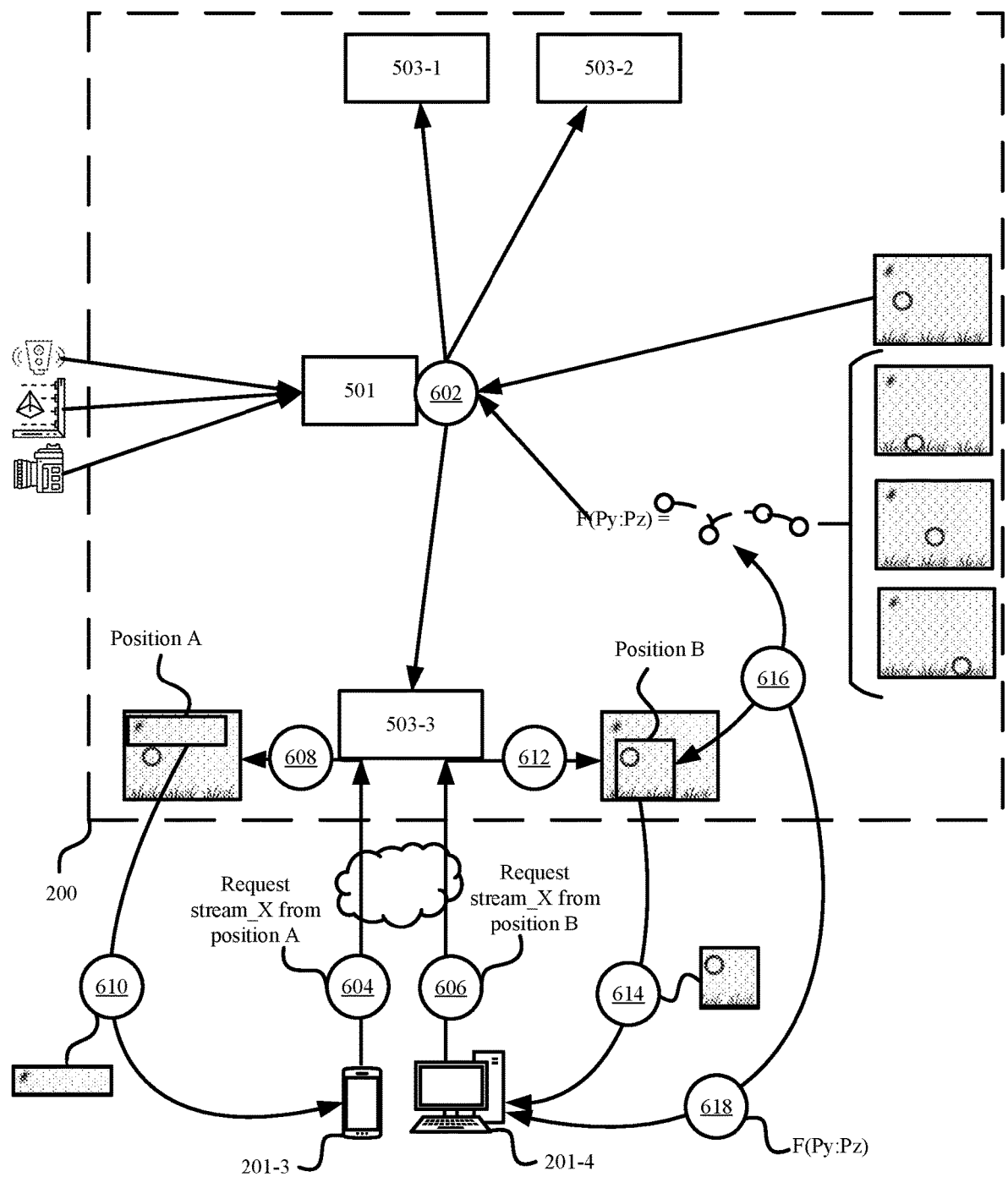
FIG. 6 illustrates the managed distribution of a 3D stream from edge distribution devices of the 3D streaming system in accordance with some embodiments presented herein.

FIG. 6 illustrates the managed distribution of a 3D stream from edge distribution devices 503 of 3D streaming system 200 in accordance with some embodiments presented herein. Point cloud generator 501 generates and distributes (at 602) a particular 3D stream to edge distribution devices 503. In this example, the particular 3D stream includes a point cloud along with updates to the point cloud that encode and/or represent a dynamic and changing 3D scene. For instance, the initial point cloud contains the 3D image data defined with positional and non-positional elements (e.g., points) for generating a first visualization of the 3D scene, and subsequent updates from the point cloud generator 501 include transformations and subsets of new and removed points to represent changes that occur to the first visualization over time.

First user device 201-3 and second user device 201-4 connect to edge distribution device 503-3 in order to request and receive the particular 3D stream. For instance, first user device 201-3 requests (at 604) the particular 3D stream from a first render position or first viewing frustum that encompasses a first region of the 3D scene, and second user device 201-4 requests (at 606) the particular 3D stream from a second render position or second viewing frustum that encompasses a second region of the 3D scene.

Edge distribution device 503-3 determines (at 608) a first set of points from the point cloud that are within the first viewing frustum or first region requested by first user device 201-3, and streams (at 610) the first set of points to first user device 201-3. Edge distribution device 503-3 further determines that the updates applied to the point cloud or 3D scene do not affect the first region requested by first user device 201-3. Accordingly, edge distribution device 503-3 does not stream the updates received from point cloud generator to first user device 201-3.

Edge distribution device 503-3 determines (at 612) a second set of points from the point cloud that are within the second viewing frustum or second region requested by second user device 201-4, and streams (at 614) the second set of points to second user device 201-4. Edge distribution device 503-3 further determines (at 616) that the updates applied to the point cloud or 3D scene affect the second region requested by second user device 201-4, and therefore streams (at 618) the updates (e.g., the transformation for moving the set of points representing a ball in the second region) to second user device 201-4.

In some such embodiments, edge distribution device 503-3 receives the entire point cloud of a represented 3D scene and updates for changes occurring within the scene from point cloud generator 501, while selectively streaming to connected user devices 201 only the point cloud data and updates that are relevant for the viewing frustums requested by each user device 201. In this manner, edge distribution devices 503 reduce the amount of data that is streamed to each user device 201, and reduce the load placed on point cloud generator 501 by managing the different streams and/or fields-of-view that are provided to different user devices 201.

Each edge distribution device 503 tracks changes that connected user devices 201 make to their respective viewing frustum. A particular edge distribution device 503 tracks changes to the viewing frustum of a particular user device 201 based on positional output provided by that particular user device 201. The positional output may include eye tracking, head tracking, gesture tracking, sensory outputs, and/or controller outputs that change the position, orientation, and/or focus of the viewing frustum. Whenever the viewing frustum for the particular user device 201 changes, the particular edge distribution device 503 determines the differences between the last presented viewing frustum and the newly requested viewing frustum, and streams new point data and/or transformations based on determined differences.

Edge distribution devices 503 may also receive input from connected user devices 201 that does not affect the field-of-view or viewing frustum, but that affect the positions or visual characteristics of one or more points from the streamed point clouds. For instance, the input may involve user interactions with objects or features presented in a streamed 3D scene that edit or otherwise adjust the objects or features. The user interactions may include moving the objects or features from one position to another, changing the visual characteristics of the objects or features, and/or otherwise editing the objects or features.

Since point cloud generator 501 is responsible for generating the point cloud representations of the 3D scenes and for generating the updates that change the 3D scenes, edge distribution devices 503 forward the inputs from user devices 201 to point cloud generator 501. Point cloud generator 501 incorporates the changes made to the represented 3D scene in the received input. Specifically, point cloud generator 501 generates updates to the point cloud for the represented 3D scene that incorporate the changed specified in the input. For instance, the input may be provided and used to adjust a particular set of points. Point cloud generator 501 defines one or more transformations for moving the set of points, changing the visual characteristics of the set of points, and/or otherwise editing the set of points as specified in the input. The edits may also involving defining a first subset of new points to add to the point cloud and/or a second subset of existing points to remove from the point cloud. Point cloud generator 501 streams the defined one or more transformations, first subset of new points, second subset of existing points, and/or other updates to edge distribution devices 503 so that the updates to the represented 3D scene are synchronized across all edge distribution devices 503. Edge distribution devices 503 then stream the updates to connected user devices 201 having a viewing frustum that encompasses the regions of the represented 3D scene affected by the changes made by those or other user devices 201.

Accordingly, with reference back to the distributed architecture of FIG. 5, user device 201-1 receiving a particular 3D stream from edge distribution device 503-1 may modify points for one or more objects or features of the 3D scene represented by the particular 3D stream. Edge distribution device 503-1 forwards the modifications from user device 201-1 to point cloud generator 501. Point cloud generator 501 incorporates the modifications in the point cloud updates, and distributes the updates to all edge distribution devices 503. Edge distribution device 503-1 then streams the point cloud updates to the user device 201-1 and other user devices 201 receiving the particular 3D stream from edge distribution device 503-1. Similarly, other edge distribution devices (e.g., edge distribution device 503-2 and 503-3) stream the point cloud updates to other user devices 201 viewing the affected regions of the 3D scene so that the modifications made by the user device 201-1 to the 3D scene are presented on all other user devices 201 receiving the same particular 3D stream of that 3D scene.

Figure 7:
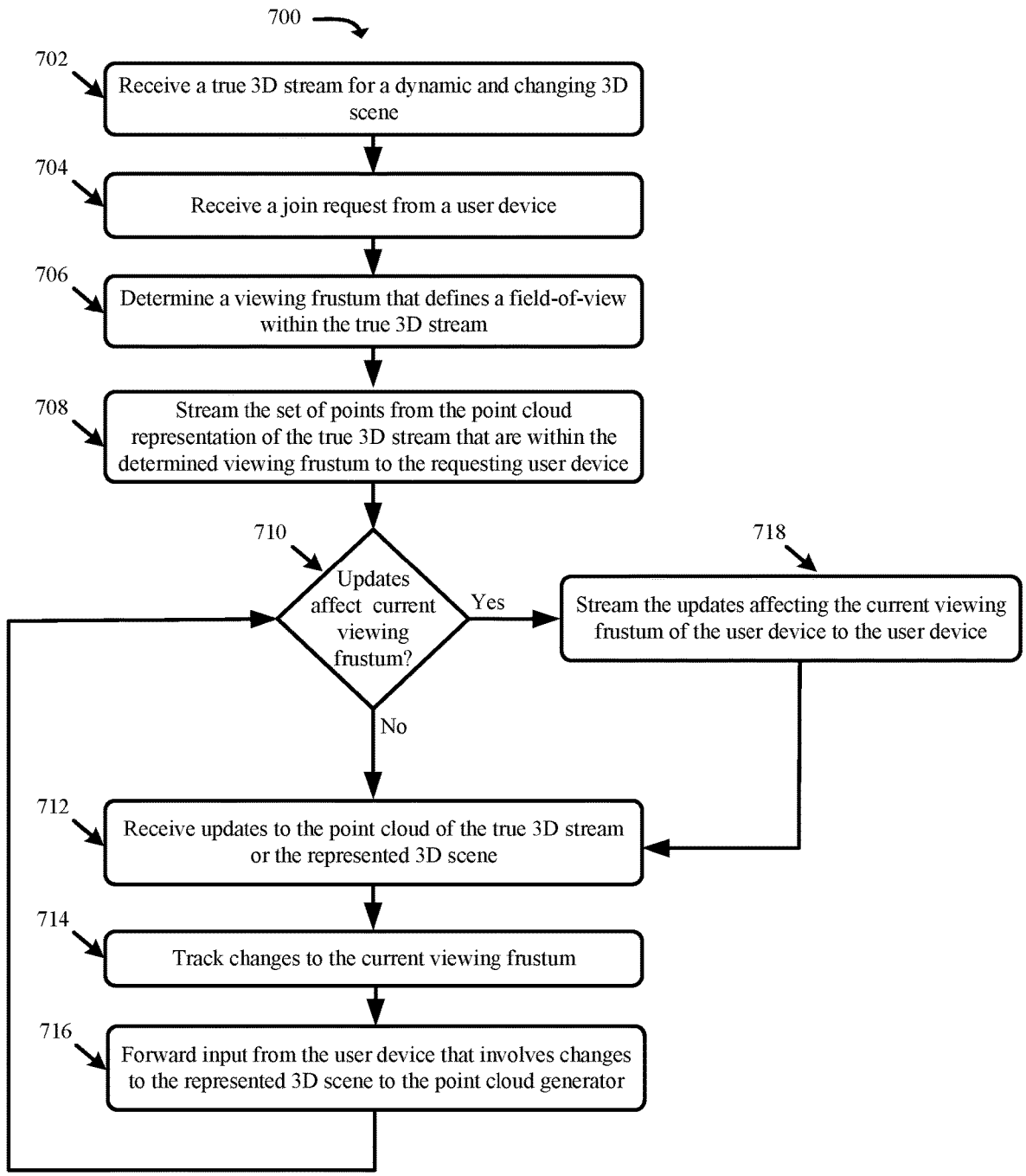
FIG. 7 presents a process for the distributed streaming of a dynamic 3D scene in accordance with some embodiments presented herein.

FIG. 7 presents a process 700 for the distributed streaming of a dynamic 3D scene in accordance with some embodiments presented herein. Process 700 is implemented by an edge distribution device 503 of 3D streaming system 200.

Process 700 includes receiving (at 702) a true 3D stream for a dynamic and changing 3D scene from point cloud generator 501. The stream initially includes the positional elements and the non-positional elements for all points of a point cloud representation of the dynamic and changing 3D scene followed by transformations that adjust the positional elements and/or the non-positional elements of different sets of points as well as data for new subsets of points to incorporate in the point cloud and/or subsets of points to remove from the point cloud at different times. In some embodiments, edge distribution device 503 stores the 3D image data associated with the true 3D stream so that the 3D image data may be streamed to connected user devices 201. Edge distribution device 503 may also apply the updates (e.g., the transformations, subsets of newly added points, and subsets of removed points) to maintain a local copy of the point cloud that reflects a current state of the dynamic and changing 3D scene. For instance, bandwidth limitations may restrict the sending of all points of the point cloud whenever the point cloud is updated, but edge distribution device 503 may apply the updates to the initially streamed set of points as they are received so that edge distribution device 503 retains updated positional and non-positional elements for all points of the point cloud that may be used to reconstruct the current state of the dynamic and changing 3D scene.

Process 700 includes receiving (at 704) a request to join the true 3D stream from a user device 201. The request may include an identifier or a Uniform Resource Locator ("URL") with which user device 201 accesses or requests the true 3D stream. For instance, the request may specify the identifier for joining a true 3D stream of a live event, an pre-recorded 3D event, a 3D video, or a 3D animation. In some embodiments, the request may be a call or request to join a 3D communication session with one or more other user devices 201 in which the true 3D stream is a 3D video feed of each user from the one or more other user devices 201 participating in the 3D communication session.

Process 700 includes determining (at 706) a viewing frustum that defines a specific field-of-view within the true 3D stream for the requesting user device 201. In some embodiments, the request may specify a position within the 3D space of the point cloud representation of the true 3D stream from which user device 201 wishes to view the 3D scene. In some other embodiments, the request may not specify a position for the viewing frustum, and edge distribution device 503 may present the 3D scene from a default or starting viewing frustum. For instance, the default or starting viewing frustum may be focused on the set of points at the center of the point cloud rather than points at the periphery or around the center of the point cloud.

Process 700 includes streaming (at 708) the set of 3D image data from the encoding of the true 3D stream that is within the determined (at 706) viewing frustum to the requesting user device 201. The set of 3D image data is a set of points from the point cloud representation of a current scene from the true 3D stream that are within the region spanned by the determined (at 706) viewing frustum. Edge distribution device 503 may position the viewing frustum within the 3D space of the updated local copy of the point cloud, and may select the set of points that are within the region of the 3D space spanned by the viewing frustum to stream (at 708) to user device 201.

Process 700 includes determining (at 710) if any updates received from point cloud generator 501 affect or are within the current viewing frustum of user device 201. In response to determining (at 710-No) that none of the received updates affect or are within the current viewing frustum of user device 201, process 700 includes receiving (at 712) additional updates to the point cloud or the represented 3D scene from point cloud generator 501, tracking (at 714) changes to the current viewing frustum of user device 201 based on first input that is received from user device 201, forwarding (at 716) second input from user device 201 that involves changes to the represented 3D scene to point cloud generator 501, and determining (at 710) if any of the newly received updates affect or are within the current viewing frustum of user device 201.

Tracking (at 714) the changes to the current viewing frustum of user device 201 includes updating the position, orientation, size, focus, and/or other properties of the viewing frustum with which user device 201 accesses the true 3D stream. For instance, user device 201 may receive and provide edge distribution device 503 input that includes a tracked eye movement, head movement, gesture, or controller input for changing the viewing frustum of user device 201 and for presenting a different part of the represented 3D scene or the represented 3D scene from a different field-of-view.

Edge distribution device 503 forwards (at 716) the second input for changing objects within the true 3D stream to point cloud generator 501 so that point cloud generator 501 incorporates the changes from the second input in the point cloud updates that are distributed to edge distribution devices 503 and so that edge distribution device 503 may stream the represented 3D scene with the incorporated changes to different user devices 201. The second input may include user interactions with one or more points presented within the current viewing frustum that change a position or visual characteristics of the one or more points. The second input may include applying different functions or edits to the one or more points.

In response to determining (at 710—Yes) that a received update from point cloud generator 501 affects or is within the current viewing frustum of user device 201, process 700 includes streaming (at 718) the updates to user device 201. Streaming (at 718) the updates includes sending transformations that adjust the previously streamed (at 708) set of points, data for a new subset of points that were not part of the previously streamed (at 708) set of points, and/or data for removing one or more of the previously streamed (at 708) set of points. To conserve bandwidth and reduce latency in streaming the dynamic 3D scene, streaming (at 718) the updates does not include resending the data for all points of the previously streamed (at 708) set of points.

User devices 201 may connect to edge distribution devices 503 over different network connections with different bandwidth, latencies, and/or other properties that affect network performance. As a result, the true 3D stream may become unsynchronized and different user devices 201 may receive and render different updates for the same viewing frustum at different times. To ensure that the 3D stream remains synchronized across the distributed architecture and all receiving user devices 201, 3D streaming system 200 may use a synchronization messaging procedure.

Figure 8:
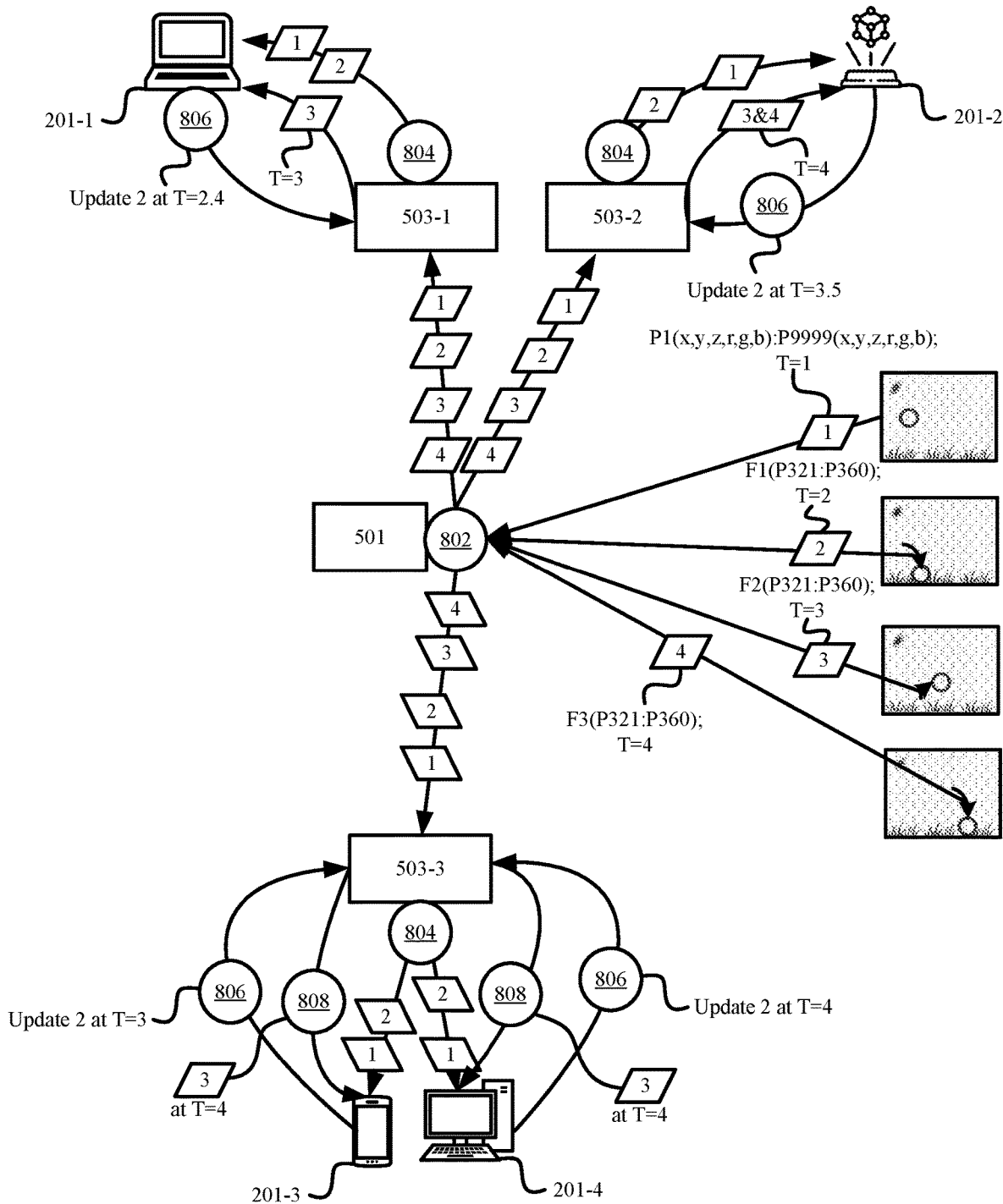
FIG. 8 illustrates an example of synchronizing the presentation of updates for the 3D stream across different user devices using a synchronization messaging procedure in accordance with some embodiments presented herein.

FIG. 8 illustrates an example of synchronizing the presentation of updates for the 3D stream across different user devices 201 using a synchronization messaging procedure in accordance with some embodiments presented herein. Point cloud generator 501 generates and distributes (at 802) updates for the point cloud representation of a dynamic 3D scene to edge distribution devices 503 as the dynamic 3D scene changes. Each update is associated with a synchronization value. The synchronization value may be a timestamp or may be an increasing value that is associated with different frames of the dynamic 3D scene. For instance, each update may generate a different frame of a 3D video, animation, or communication session, and may therefore be associated with an identifier for the frame that incorporates that update. Point cloud generator 501 distributes (at 802) the updates with the synchronization values to edge distribution device 503.

Edge distribution devices 503 stream (at 804) one or more of the updates with the synchronization values to user devices 201. User devices 201 confirm receipt of an update and indicate their position within the 3D stream by returning (at 806) the synchronization value or other identifier of the last received and/or rendered update to one of the edge distribution devices 503.

Edge distribution devices 503 detect a synchronization issue based on the time at which the synchronization values are returned (at 806) from user devices 201. For instance, edge distribution device 503-3 may receive a particular synchronization value from user device 201-4 one second after the particular synchronization value is received from another user device 201-3 or a threshold amount of time after sending the update with the particular synchronization value to user device 201-4. The delay with which user device 201-4 returns the particular synchronization value to edge distribution device 503-3 indicates that the true 3D stream being presented on user device 201-4 is not synchronized with the true 3D stream being presented on other user devices 201.

Edge distribution device 503-3 adjusts (at 808) the rate at which it sends subsequent updates to user devices 201-3 and 201-4. In some embodiments, edge distribution device 503-3 adjusts (at 808) the rate at which it sends the subsequent updates based on the delay or time at which edge distribution device 503-3 receives the particular synchronization value from each user device 201-3 and 201-4. For instance, in response to determining that the true 3D stream on user device 201-4 is one second delayed relative to the true 3D stream on user devices 201-3, edge distribution device 503-3 may send a next update to user device 201-4 one second before sending the same update to user device 201-3, may skip an update to user device 201-4, or may send multiple updates at one time to user device 201-4 to resynchronize the streams. In this case, edge distribution device 503-3 synchronizes the true 3D stream for user devices 201-3 and 201-4 that are connected to that edge distribution device 503-3.

In some embodiments, edge distribution devices 503 synchronize the true 3D stream for all connected user devices 201. In some such embodiments, edge distribution devices 503 may notify one another of user devices 201 (e.g., user device 201-2 and 201-4) that are delayed by more than a threshold amount of time, and edge distribution devices 503 may adjust the rate at which updates are distributed to accommodate the delays experienced by those user devices 201. In some embodiments, an edge distribution devices 503 may skip one or more updates that delayed user devices 201 miss in order to keep the updates synchronized across all user devices 201 or, as shown by edge distribution device 503-2 in FIG. 8, may provide delayed user devices 201 multiple updates at one time to keep the true 3D stream synchronized with a desired rate.

Figure 9:
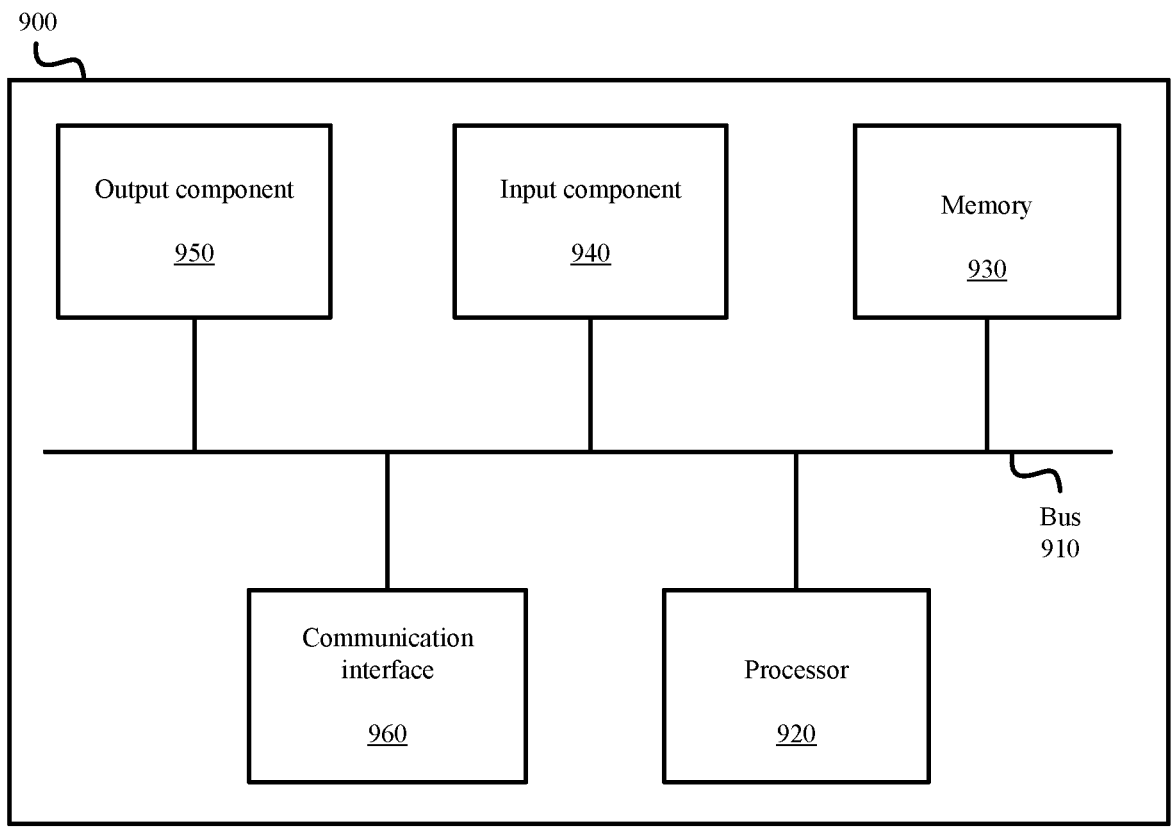
FIG. 9 illustrates example components of one or more devices, according to one or more embodiments described herein.

FIG. 9 is a diagram of example components of device 900. Device 900 may be used to implement one or more of the tools, devices, or systems described above (e.g., 3D streaming system 200, point cloud generator 501, edge distribution device 503, user device 201, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   generating, at a particular streaming server, a single three-dimensional ("3D") stream for all devices that connect to the 3D stream at different times, wherein generating the single 3D stream comprises defining a plurality of 3D image constructs that collectively represent a 3D scene at a first time and defining a plurality of transformations that recreate changes occurring to different subsets of the plurality of 3D image constructs at different times of the 3D stream, wherein each 3D image construct of the plurality of 3D image constructs corresponds to a discrete point, mesh, or polygon that is defined with at least a position;
   receiving a first request from a first device for a visualization of the 3D scene from a first viewing frustum at a second time that is after the first time, and a second request from a second device for a visualization of the 3D scene from a second viewing frustum that is different than the first viewing frustum at the second time that is after the first time;
   streaming a first set of 3D image constructs from the plurality of 3D image constructs that is within the first viewing frustum to the first device in response to the first request and no transformations from the plurality of transformations being defined for changes occurring between the first time and the second time to 3D image constructs in the first set of 3D image constructs within the first viewing frustum;
   streaming a second set of 3D image constructs from the plurality of 3D image constructs data that is within the second viewing frustum to the second device and a first transformation from the plurality of transformations in response to the second request arriving at the second time and the first transformation being defined for changes occurring between the first time and the second time to a first subset of the second set of 3D image constructs in the second view frustum, wherein the first set of 3D image constructs and the second set of 3D image constructs are less than the plurality of 3D image constructs,
   wherein the first transformation is a single expression that recreates a plurality of adjustments that are applied to the first subset of 3D image constructs between the first time and the second time without individually specifying each adjustment of the plurality of adjustments or an updated position or other changes to each 3D image construct of the first subset of 3D image constructs;
   selectively streaming the plurality of transformations to the first device and the second device at a third time that is after the second time, wherein selectively streaming the plurality of transformations comprises:
      streaming a second transformation from the plurality of transformations to the first device in response to the second transformation being defined for changes occurring between the second time and the third time to a second subset of the first set of 3D image constructs in the first viewing frustum; and
      withholding the second transformation from the second device in response to the second transformation not affecting 3D image constructs in the second viewing frustum.

2. The method of claim 1 further comprising:
   tracking a modified first viewing frustum in response to changes made to the first viewing frustum by the first device; and
   streaming a third transformation of the plurality of transformations to the first device in response to the third transformation affecting 3D image constructs in the modified first viewing frustum.

3. The method of claim 1, wherein generating the single 3D stream further comprises:
   detecting a change in the 3D scene that affects the first subset of 3D image constructs; and
   defining the first transformation by defining an equation that adjusts one or more of the position or visual characteristics of the first subset of 3D image constructs to match the change in the 3D scene and the plurality of adjustments made to the first subset of 3D image data.

4. The method of claim 3, wherein streaming the second set of 3D image constructs and the first transformation comprises:
   transmitting the first transformation with an identifier for each 3D image construct of the first subset of 3D image constructs that is modified by the first transformation to the first device in place of each adjustment from the plurality of adjustments for the position or the visual characteristics of each 3D image construct.

5. The method of claim 1 further comprising:
   receiving input from the first device that changes a subset of 3D image constructs from the second set of 3D image constructs; and
   determining one or more adjustments to the second subset of 3D image constructs based on the input from the first device.

6. The method of claim 5 further comprising:
   transmitting, to the second device, the one or more adjustments made to the subset of 3D image constructs within the second viewing frustum of the second device in response to the input from the first device.

7. The method of claim 1, wherein defining the first update generating the single 3D stream further comprises:
   adding, to the first transformation, data for new 3D image constructs that enter the first second viewing frustum as part of the plurality of adjustments that are applied to the first subset of 3D image constructs, wherein the new 3D image constructs add one or more points, meshes, or constructs to modify a representation of a feature or object represented by the first subset of 3D image constructs.

8. The method of claim 7, wherein generating the single 3D stream further comprises:
   identifying one or more 3D image constructs from the second set of 3D image constructs to remove from the second viewing frustum after the plurality of adjustments are applied to the first subset of 3D image constructs; and
   adding identifiers for the one or more 3D image constructs to the first transformation.

9. The method of claim 1 further comprising:
   predicting a change from the first viewing frustum to a modified first viewing frustum based on previously tracked changes to the first viewing frustum; and
   streaming an update to the first device, wherein the update changes from the first set of 3D image constructs to a third set of 3D image constructs from the plurality of 3D image constructs that is within the modified first viewing frustum.

10. The method of claim 9, wherein streaming the update comprises:
    transmitting the update prior to the first device providing input that changes the first viewing frustum to the modified first viewing frustum.

11. The method of claim 9,
    wherein the modified first viewing frustum retains a particular subset of the first set of 3D image constructs from the first viewing frustum and comprises a new subset of the plurality of 3D image constructs; and
    wherein the update comprises data for the new subset of the plurality of 3D image constructs.

12. The method of claim 11, wherein the update further comprises an identification of one or more 3D image constructs from the first set of 3D image constructs to remove from the modified first viewing frustum and that are not in the particular subset of the first set of 3D image constructs.

13. The method of claim 1 further comprising:
    distributing the plurality of transformations from the particular streaming server to at least a first edge distribution device that tracks the first viewing frustum of the first device, and a second edge distribution device that tracks the second viewing frustum of the second device;
    distributing the second transformation from the first edge distribution device to the first device in response to the first edge distribution device determining that the second transformation affects the first viewing frustum; and
    distributing the first transformation from the second edge distribution device to the second device in response to the second edge distribution device determining that the first transformation affects the second viewing frustum.

14. The method of claim 1 further comprising:
    tracking a last update of the 3D stream provided to the first device and the second device;
    determining that the first device reconnects to the 3D stream at a fourth time after being disconnected over a duration past the third time;
    determining that the first device has not received a third transformation and a fourth transformation from the plurality of transformations that are defined for changes occurring over the duration past the third time based on the last update of the 3D stream tracked for the first device; and
    streaming a third set of 3D image constructs instead of the third transformation and the fourth transformation in response to determining that the third set of 3D image constructs recreates the 3D scene from the first viewing frustum at the fourth time with less data than the third transformation and the fourth transformation.

15. The method of claim 1, wherein streaming the first set of 3D image constructs comprises:
    selecting a set of all 3D image constructs from the plurality of constructs that are positioned within a near plane and a far plane of the first viewing frustum;
    determining one or more 3D image constructs from the set of all 3D image constructs that are entirely obscured from view by other constructs; and
    filtering the set of all 3D image constructs to the first set of 3D image constructs by removing the one or more 3D image constructs from the first set of 3D image constructs.

16. The method of claim 1 further comprising:
    receiving a third request from a third device to join the 3D stream at the third time with a visualization of the 3D scene from the first viewing frustum;
    determining that the third device does not have the first set of 3D image constructs affected by the second transformation defined for the first viewing frustum at the third time; and
    streaming a third set of 3D image constructs to the third device instead of the first set of 3D image constructs and the second transformation in response to determining that the third device does not have the first set of 3D image constructs affected by the second transformation.

17. A three-dimensional ("3D") streaming system comprising:
    one or more hardware processors configured to:
       generate, at a particular streaming server of the streaming system, a single three-dimensional ("3D") stream for all devices that connect to the 3D stream at different times, wherein generating the single 3D stream comprises defining a plurality of 3D image constructs that collectively represent a 3D scene at a first time and defining a plurality of transformations that recreate changes occurring to different subsets of the plurality of 3D image constructs at different times of the 3D stream, wherein each 3D image construct of the plurality of 3D image constructs corresponds to a discrete point, mesh, or polygon that is defined with at least a position;
       receive a first request from a first device for a visualization of the 3D scene from a first viewing frustum at a second time that is after the first time, and a second request from a second device for a visualization of the 3D scene from a second viewing frustum that is different than the first viewing frustum at the second time that is after the first time;
       stream a first set of 3D image constructs from the plurality of 3D image constructs that is within the first viewing frustum to the first device in response to the first request and no transformations from the plurality of transformations being defined for changes occurring between the first time and the second time to 3D image constructs in the first set of 3D image constructs within the first viewing frustum;

stream a second set of 3D image constructs from the plurality of 3D image constructs data that is within the second viewing frustum to the second device and a first transformation from the plurality of transformations in response to the second request arriving at the second time and the first transformation being defined for changes occurring between the first time and the second time to a first subset of the second set of 3D image constructs in the second view frustum, wherein the first set of 3D image constructs and the second set of 3D image constructs are less than the plurality of 3D image constructs,
    wherein the first transformation is a single expression that recreates a plurality of adjustments that are applied to the first subset of 3D image constructs between the first time and the second time without individually specifying each adjustment of the plurality of adjustments or an updated position or other changes to each 3D image construct of the first subset of 3D image constructs;
    selectively stream the plurality of transformations to the first device and the second device at a third time that is after the second time, wherein selectively streaming the plurality of transformations comprises:
        streaming a second transformation from the plurality of transformations to the first device in response to the second transformation being defined for changes occurring between the second time and the third time to a second subset of the first set of 3D image constructs in the first viewing frustum; and
        withholding the second transformation from the second device in response to the second transformation not affecting 3D image constructs in the second viewing frustum.

18. The 3D streaming system of claim 17, wherein the one or more hardware processors are further configured to:
    track a modified first viewing frustum in response to changes made to the first viewing frustum by the first device; and
    stream a third transformation of the plurality of transformations to the first device in response to the third transformation affecting 3D image constructs in the modified first viewing frustum.

19. The 3D streaming system of claim 17, wherein streaming the second set of 3D image constructs and the first transformation comprises:
    transmitting the first transformation with an identifier for each 3D image construct of the first subset of 3D image constructs that is modified by the first transformation to the first device in place of each adjustment from the plurality of adjustments for each 3D image construct.

20. A non-transitory computer-readable medium storing instructions that, when executed by one or more processors of a three-dimensional ("3D") streaming system, cause the 3D streaming system to perform operations comprising:
    generating, at a particular streaming server, a single three-dimensional ("3D") stream for all devices that connect to the 3D stream at different times, wherein generating the single 3D stream comprises defining a plurality of 3D image constructs that collectively represent a 3D scene at a first time and defining a plurality of transformations that recreate changes occurring to different subsets of the plurality of 3D image constructs at different times of the 3D stream, wherein each 3D image construct of the plurality of 3D image constructs corresponds to a discrete point, mesh, or polygon that is defined with at least a position;
    receiving a first request from a first device for a visualization of the 3D scene from a first viewing frustum at a second time that is after the first time, and a second request from a second device for a visualization of the 3D scene from a second viewing frustum that is different than the first viewing frustum at the second time that is after the first time;
    streaming a first set of 3D image constructs from the plurality of 3D image constructs that is within the first viewing frustum to the first device in response to the first request and no transformations from the plurality of transformations being defined for changes occurring between the first time and the second time to 3D image constructs in the first set of 3D image constructs within the first viewing frustum;
    streaming a second set of 3D image constructs from the plurality of 3D image constructs data that is within the second viewing frustum to the second device and a first transformation from the plurality of transformations in response to the second request arriving at the second time and the first transformation being defined for changes occurring between the first time and the second time to a first subset of the second set of 3D image constructs in the second view frustum, wherein the first set of 3D image constructs and the second set of 3D image constructs are less than the plurality of 3D image constructs,
        wherein the first transformation is a single expression that recreates a plurality of adjustments that are applied to the first subset of 3D image constructs between the first time and the second time without individually specifying each adjustment of the plurality of adjustments or an updated position or other changes to each 3D image construct of the first subset of 3D image constructs;
    selectively streaming the plurality of transformations to the first device and the second device at a third time that is after the second time, wherein selectively streaming the plurality of transformations comprises:
        streaming a second transformation from the plurality of transformations to the first device in response to the second transformation being defined for changes occurring between the second time and the third time to a second subset of the first set of 3D image constructs in the first viewing frustum; and
        withholding the second transformation from the second device in response to the second transformation not affecting 3D image constructs in the second viewing frustum.

\* \* \* \* \*